April 17, 1956   K. RÄNTSCH   2,741,946
INTERFERENCE MICROSCOPE
Filed July 28, 1951
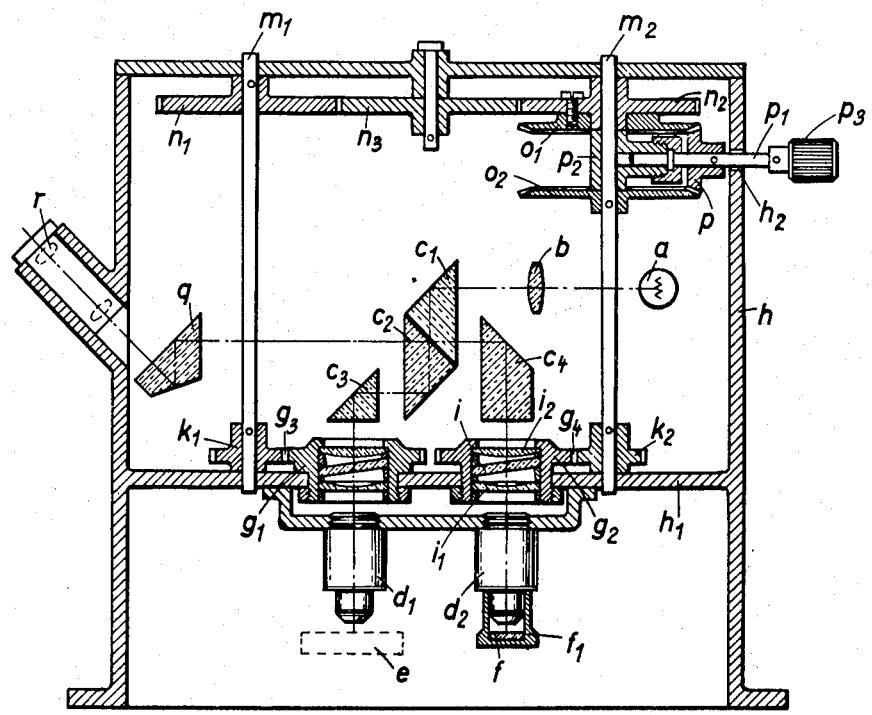

United States Patent Office 2,741,946
Patented Apr. 17, 1956

2,741,946
INTERFERENCE MICROSCOPE

Kurt Räntsch, Heidenheim (Brenz), Germany, assignor to Carl Zeiss, Heidenheim (Brenz), Germany Application July 28, 1951, Serial No. 239,048

Claims priority, application Germany August 16, 1950

5 Claims. (Cl. 88—39)

In the hitherto known interference microscopes, which especially serve for examining the surface of opaque bodies, interference instruments have been used. In these instruments a light beam is divided into two by a beam splitter, one of the split beams being reflected at the surface under test and the other split beam being reflected at a comparison surface, and the arrangement is such that the reflected split beams are combined at the beam splitter so that they interfere with one another. In the path of each split beam is located a microscope objective through which the split beam passes when travelling to and from the surface under test or the comparison surface. The interference fringes are observed through an ocular, a magnified image of the surface examined being visible at the same time. For adjusting the width of the interference bands and the direction thereof one hitherto has mounted in one of the two beams a plane-parallel transparent plate, which could be tilted about an axis perpendicular to the optical axis. Hereby however the path difference of the two interfering beams is changed. If therefore one wanted to change only the width or the band direction of the interference fringes, then this was at the same time connected with a change of the length of path. That to a considerable degree rendered difficult the observation.

According to the invention an essentially more favorable arrangement results if plane-parallel transparent plates of equal thickness and being equally inclined to the optical axis passing through it are mounted each one in the path of interfering beams, said plates without change in their inclination to the optical axis being rotatable about said optical axis. In this manner the band direction and the band width can be changed without the length of path of the interfering beams being altered, so that one obtains convenient observation conditions. If according to a further feature of the invention one turns the two plane-parallel plates in the same direction by equal amounts, then one changes solely the band direction; if one turns them by equal amounts in opposite direction, then only the band width is changed. One attains an especially suitable arrangement, if one can execute these two adjustments with the same activating knob. In order not to produce astigmatism through the obliquely placed plane-parallel plates, it is advisable to mount them at a place in the light path of parallel light rays. If one employs objectives of customary construction, then one can in known manner bring about a parallel path of rays in that one mounts in front of each plane parallel plate a negative lens and behind it a positive lens with the same refractive power. It is expedient to mount these two lenses so that they are rotatable together with the plane-parallel plates.

The invention is illustrated in the accompanying drawing by a schematically presented longitudinal section of an interference microscope. The light coming from a light source $a$ is conducted through a condenser system $b$ to a system of four prisms $c_1$, $c_2$, $c_3$, and $c_4$. The two prisms $c_1$ and $c_2$ are cemented together; the cemented surface acts as a beam splitting surface so that two split beams are formed. The two split beams are conducted by way of the prisms $c_3$, $c_4$ respectively to microscope objectives $d_1$, and $d_2$ so that one split beam strikes a surface to be tested (in the drawing indicated by a test object $e$) and the other split beam is incident on a mirror $f$ serving as a comparison surface. This mirror $f$ is attached to the objective $d_2$ by means of a slip-on-mount $f_1$. Between the prism $c_3$ and the associated objective $d_1$, and between prism $c_4$ and objective $d_2$ similar rotatable mounts $g_1$ and $g_2$ are seated in apertures in a partition $h_1$ of the instrument casing $h$. Each of the mounts $g_1$ and $g_2$ carries a plane parallel transparent plate $i$ which is inclined to the respective objective axis as well as a negative lens $i_1$ on one side of the plate $i$ and on the other side a positive lens $i_2$. The refractive powers of these lenses are so selected that parallel rays travel between them. Further each mount $g_1$ and $g_2$ has a spur wheel $g_3$, $g_4$, engaged with smaller spur wheels $k_1$, $k_2$. The wheels $k_1$ and $k_2$ are secured on shafts $m_1$, $m_2$, which also carry spur wheels $n_1$ and $n_2$. The wheel $n_1$ is fixed to shaft $m_1$ while wheel $n_2$ is freely rotatable around shaft $m_2$. The two wheels $n_1$ and $n_2$ are engaged with one another through an intermediate wheel $n_3$ mounted on the wall of housing $h$. There are also mounted upon the shaft $m_2$ two bevel wheels $o_1$ and $o_2$, which are in engagement with one another by way of a bevel wheel $p$ acting as differential wheel. The bevel wheel $o_1$ is screwed firmly to spur wheel $n_2$, while the bevel wheel $o_2$ is secured to the shaft $m_2$. The bevel wheel $p$ is firmly connected with its shaft $p_1$, which by means of bushing $p_2$ is rotatable about its own shaft as well as also swingable about the shaft $m_2$. It extends through a slit $h_2$ out of the housing $h$, and carries outside an activating knob $p_3$ so that one can rotate the bevel wheel $p$ as well as also swing it about the shaft $m_2$. Contrary to the drawn representation the two shafts $m_1$ and $m_2$ are arranged somewhat behind the plane of the drawing, in order that the light path lying in the plane of the drawing is free. The light returning after reflection at the test object $e$, and the comparison mirror $f$ is conducted to the eye of the observer through a prism $q$ and an ocular $r$. If the knob $p_3$ is rotated about its shaft, then in the two shafts $m_1$ and $m_2$ and also the two plane-parallel plates $i$ rotate by equal amounts in opposite direction, so that the band width can be altered. If, on the other hand, the knob $p_3$ is swung about the shaft $m_2$, then both shafts $m_1$ and $m_2$ and also the plane-parallel plates $i$ rotate in the same direction and by equal amounts, so that one can change the band direction, without altering the band width.

I claim:

1. An interference microscope for examining the surface quality of solid bodies comprising in a housing a light source, a light partially reflecting and partially transmitting surface for splitting a light beam from said source into two coherent beams, two microscope objectives having equal optical properties as regards magnification and aperture, a standard comparison mirror surface associated with and located normal to the optical axis of the one of said objectives in its outer focal plane, the said test body surface associated with and located normal to the optical axis of the other of said objectives in its outer focal plane, reflecting means disposed between said splitting surface and each of said objectives for directing each one of said split beams through one of said objectives onto said standard comparison mirror surface and said test body surface respectively, two thin plane-parallel glass plates of equal thickness the one located in the path of rays of the one said split beam between said reflecting means and the one said objective near said objective, and the other said glass plate located in the path of rays of the other said split beam between said reflecting means and the other said objective near said other objective, both said plates disposed inclined at equal angles to the respective optical axis of the respective said objective, and means for rotating each said plate for equal angular amounts round the optical axis of the respective said objective, said reflecting means being disposed to reflect both said split partial beams each through the respective said glass plate and the respective said objective onto said standard comparison mirror surface and said test body surface respectively, and after reflection from said surfaces back through the respective said objective to said partially reflecting and partially transmitting surface such that the said beams reflected from said standard comparison mirror surface and said test body surface respectively are partially reflected and partially transmitted and recombined into one coincident path of light, and means forming an image of the interference fringes arising between said recombined partial beams, the thickness of said glass plates being so small as to obtain, by rotation of said plates, adjustment as regards band width and band direction of said arising interference fringes.

2. In an interference microscope according to claim 1 said means for rotating said plates comprising means for rotating both said plates for equal angular amounts in the same direction.

3. In an interference microscope according to claim 1 said means for rotating said plates comprising means for rotating both said plates for equal angular amounts in countercurrent direction.

4. In an interference microscope according to claim 1 said means for rotating said plates comprising a toothed-wheel gearing for rotating both said plates in the same angular direction, said gearing including a differential gear mechanism for rotating both said plates in a countercurrent direction for equal angular amounts.

5. In an interference microscope according to claim 1 said objectives each comprising lenses having parallel path of rays between them, said plates being located each between said lenses of the respective said objectives.

References Cited in the file of this patent

UNITED STATES PATENTS

| | | |
|---|---|---|
| 2,151,631 | Williams | Mar. 21, 1939 |
| 2,342,843 | Corte et al. | Feb. 29, 1944 |
| 2,555,387 | Zobel | June 5, 1951 |
| 2,629,283 | Zobel | Feb. 24, 1953 |